United States Patent [19]
Craig

[11] Patent Number: 5,163,231
[45] Date of Patent: Nov. 17, 1992

[54] SHELL CASE LENGTH GAUGE APPARATUS

[76] Inventor: Jack R. Craig, Box 116, Mt. Vernon, Ky. 40456

[21] Appl. No.: 824,346

[22] Filed: Jan. 23, 1992

[51] Int. Cl.$^5$ .............................................. G01B 3/38
[52] U.S. Cl. ................................... 33/501.45; 33/567
[58] Field of Search ................. 133/501.45, 501.08, 133/501.05, 567, 562, 501.06, 506

[56] References Cited

U.S. PATENT DOCUMENTS

| | | | |
|---|---|---|---|
| 2,823,458 | 2/1958 | Zabloudil | 33/506 |
| 2,837,828 | 6/1958 | Cybulski | 33/567 |
| 3,217,417 | 11/1965 | Love et al. | 33/506 |
| 3,318,006 | 5/1967 | Martinez | 33/562 |
| 3,482,322 | 12/1969 | Ito | 33/567 |

Primary Examiner—Harry N. Haroian
Attorney, Agent, or Firm—Leon Gilden

[57] ABSTRACT

A gauge structure is arranged to provide for the immediate measurement of a case length prior to a reloading procedure and subsequent to the reloading procedure to measure the case length and associated bullet member seated therewithin. The structure is arranged to accommodate various calibers and bullets of various gauges and associated sizes therefore. A case housing to include positioning of various of the gauges therewithin in association with a magnification lens arranged for mounting relative to the housing for enhanced ease of visual inspection of the cases and assembled cartridges is provided.

4 Claims, 5 Drawing Sheets

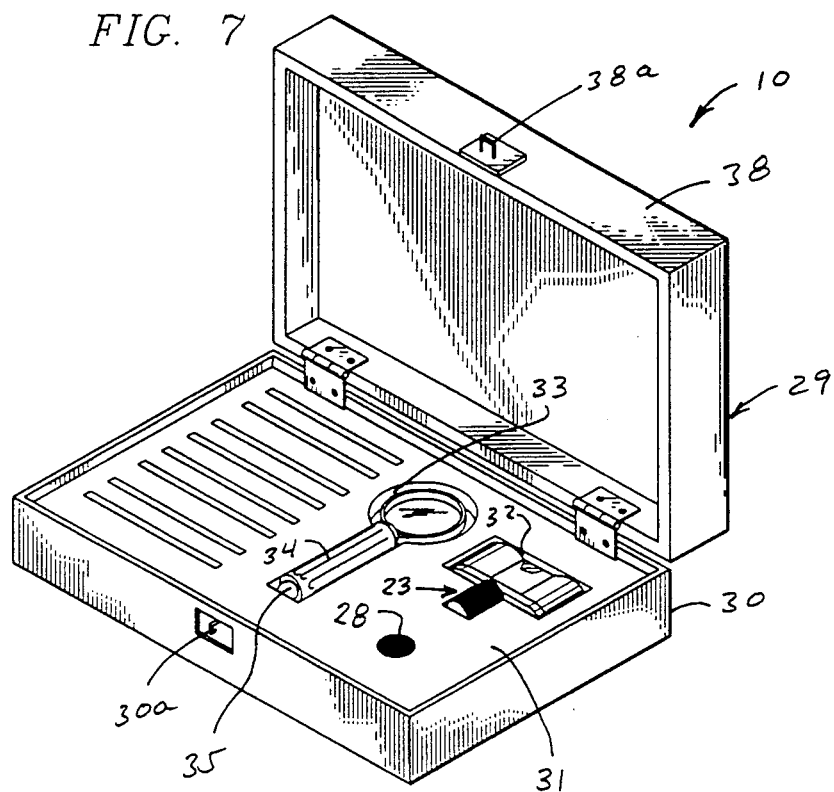
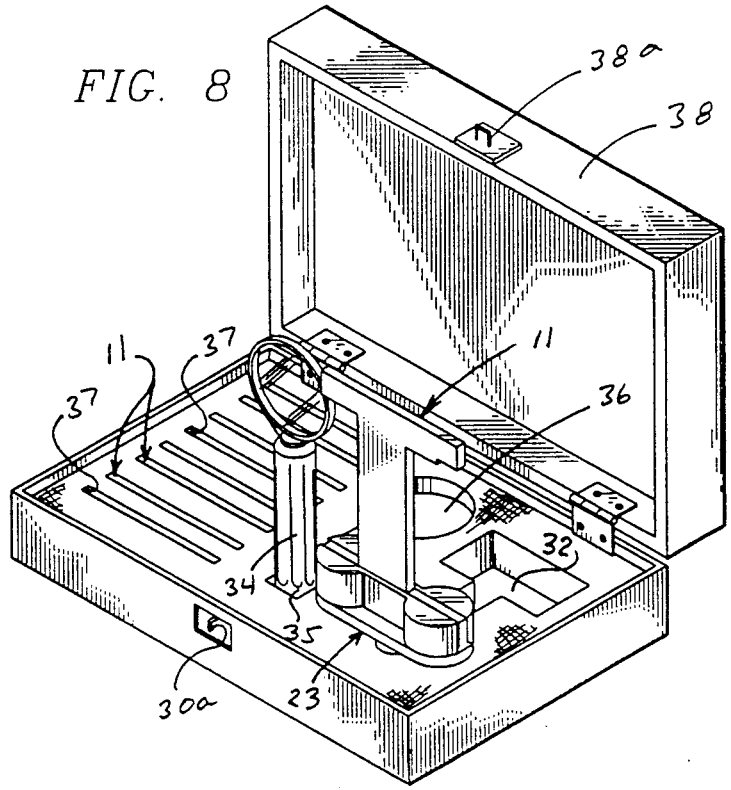

SHELL CASE LENGTH GAUGE APPARATUS

BACKGROUND OF THE INVENTION

1. Field of the Invention

The field of invention relates to ammunition reloading apparatus, and more particularly pertains to a new and improved shell case length gauge apparatus wherein the same is arranged for the inspection of bullets assembled relative to shell cases individually or in combination.

2. Description of the Prior Art

In the reloading procedure, a shell case arranged to accommodate a bullet seated therewithin subsequent to positioning of gun powder and the like utilized for repulsion is constructed to be of a predetermined length within certain longitudinal measurements. A shell casing to exceed such measurement may intrude into a firing chamber of an associated rifle or pistol increasing pressures during a firing procedure to exceed capacities of associated firearm. Accordingly, a shell casing is mandated to be within the aforenoted predetermined range of measurement. Gauge structure is arranged in the prior art for measurements such as calipers and the like, but heretofore, a gauging apparatus has not been presented of convenience and interrelationship as set forth by the instant invention. Examples of the prior art include U.S. Pat. No. 4,890,572 to Huang setting forth a measurement gauge utilizing a dial plate.

Such gauges for gauging various orientations and positioning of structure is set forth in the U.S. Pat. No. 4,322,888; U.S. Pat. No. 4,928,392; U.S. Pat. No. 4,326,336; and U.S. Pat. No. 4,700,484.

Accordingly, it may be appreciated that there continues to be a need for a new and improved shell case length gauge apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of gauge apparatus now present in the prior art, the present invention provides a shell case length gauge apparatus wherein the same is arranged to measure a shell casing prior to and subsequent to assembly with an associated projectile bullet. As such, the general purpose of the present invention, which will be described subsequently in greater detail, is to provide a new and improved shell case length gauge apparatus which has all the advantages of the prior art gauge apparatus and none of the disadvantages.

To attain this, the present invention provides a gauge structure arranged for the immediate measurement of a case length prior to a reloading procedure and subsequent to the reloading procedure to measure the case length and associated bullet member seated therewithin. The structure is arranged to accommodate various calibers and bullets of various gauges and associated sizes therefore. A case housing to include positioning of various of the gauges therewithin in association with a magnification lens arranged for mounting relative to the housing for enhanced ease of visual inspection of the cases and assembled cartridges is provided.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shell case length gauge apparatus which has all the advantages of the prior art gauge apparatus and none of the disadvantages.

It is another object of the present invention to provide a new and improved shell case length gauge apparatus which may be easily and efficiently manufactured and marketed.

It is a further object of the present invention to provide a new and improved shell case length gauge apparatus which is of a durable and reliable construction.

An even further object of the present invention is to provide a new and improved shell case length gauge apparatus which is susceptible of a low cost of manufacture with regard to both materials and labor, and which accordingly is then susceptible of low prices of sale to the consuming public, thereby making such shell case length gauge apparatus economically available to the buying public.

Still yet another object of the present invention is to provide a new and improved shell case length gauge apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of the apparatus in assembled configuration.

FIG. 8 is an isometric illustration of the apparatus oriented and arranged for use.

DESCRIPTION OF THE PREFERRED EMBODIMENT

Figure 1:
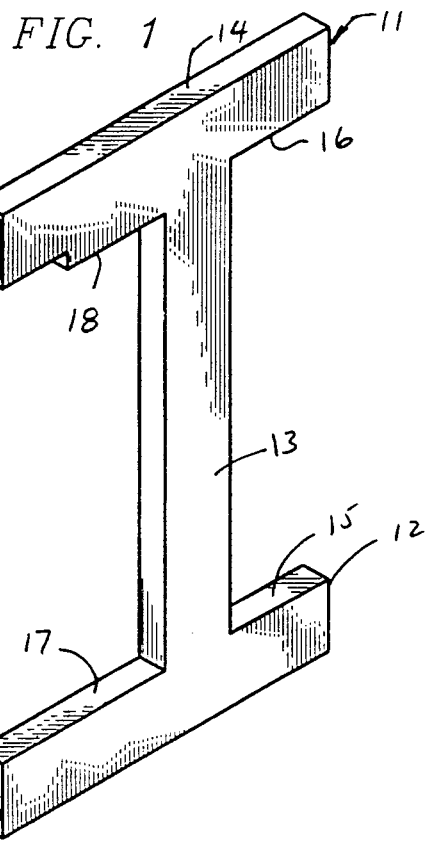
FIG. 1 is an isometric illustration of a gauge member utilized by the invention.
Figure 2:
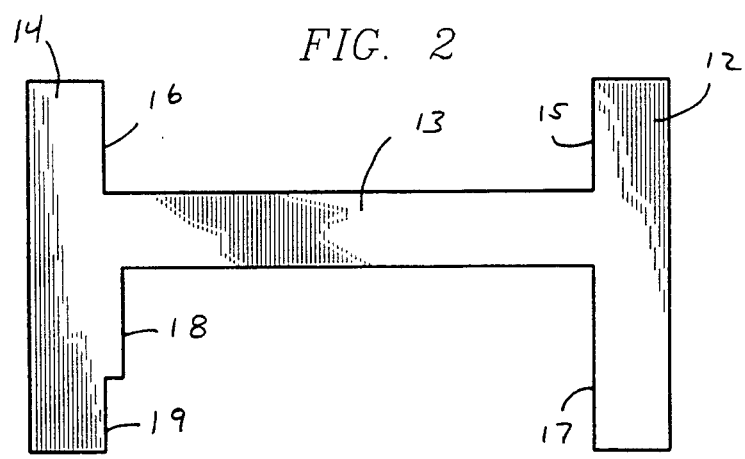
FIG. 2 is an orthographic top view of the gauge member.
Figure 3:
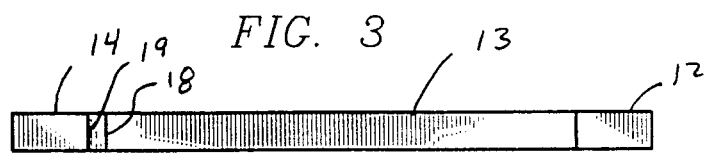
FIG. 3 is an orthographic side view of the instant invention.

With reference now to the drawings, and in particular to FIGS. 1 to 10 thereof, a new and improved shell case length gauge apparatus embodying the principles and concepts of the present invention and generally designated by the reference numerals 10 and 10a will be described.

Figure 4:
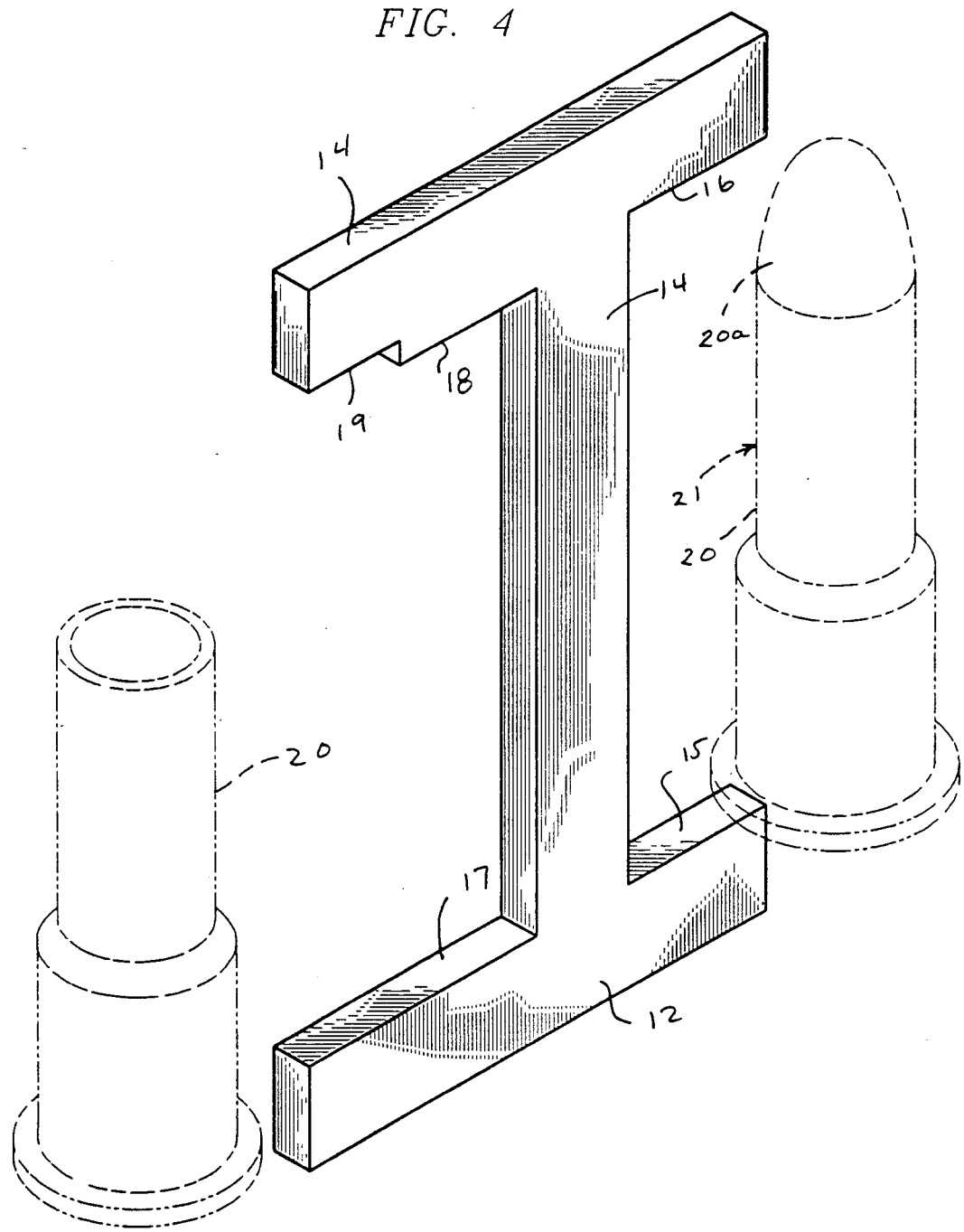
FIG. 4 is an isometric illustration of the invention in use.

More specifically, the shell case length gauge apparatus of the instant invention essentially comprises at least one gauge member 11 of a generally "I" shaped configuration. The gauge member includes a first leg 12, a second leg 13 medially and orthogonally intersecting the first leg 12, and a third leg 14 medially intersected by the second leg 13 at an upper distal end of the second leg, wherein the third leg and the first leg are arranged in a parallel coextensive relationship relative to one another. The first leg 12 includes a first leg first planar surface 15 in a facing and parallel relationship to a third leg planar first surface 16 defined by a predetermined first length therebetween. The first leg 12 further includes a first leg planar second surface 17 coplanar with the first surface 15 and parallel to a third leg planar second surface 18 defined by a predetermined second length less than the first length. The predetermined first length is arranged for measuring a casing 20 and bullet 20a in assembled configuration 21, as illustrated in FIG. 4, with the second length between the surfaces 17 and 18 arranged for measuring the casing 20 alone. A casing to exceed the second length must be trimmed to interfit therewith. The use of a third leg third surface 19 spaced from and parallel to the third leg second surface 18 may be accompanied by a predetermined third length greater than the second length yet less than the first length to provide for a maximum dimension of a shell casing if so desired.

Figure 5:
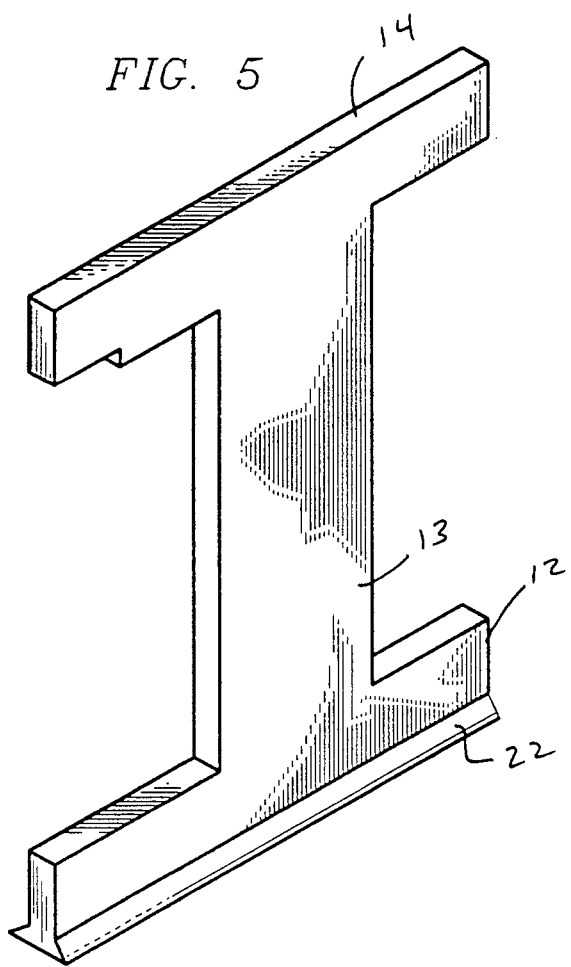
FIG. 5 is an isometric illustration of the gauge member utilizing a dove tail mount.
Figure 6:
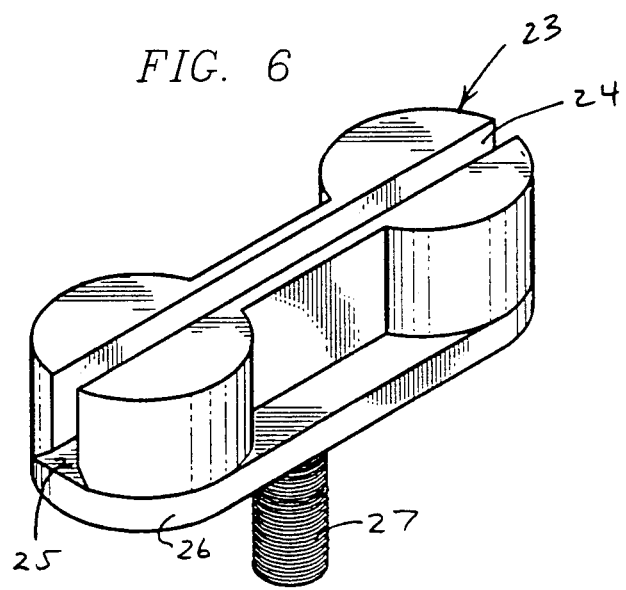
FIG. 6 is an isometric illustration of a mounting member utilized in association with a gauge member as set forth in FIG. 5.

The gauge member 11, as illustrated in FIG. 5, includes a devetail projection 20 mounted to a bottom surface of the first leg 12 coextensive therewith arranged for mounting within a support mount 23. The support mount 23, as illustrated in FIG. 6, includes a support mount slot 24 for receiving the first leg 12 complementarily therewithin, with the slot 24 including a dovetail recess 25 formed at a lower distal end of the slot 24 to receive the dovetail projection 22. The dovetail recess is positioned above a floor plate 26 orthogonally oriented relative to the slot 24 and the dovetail recess 25. Externally threaded support rod 27 is orthogonally mounted medially to a bottom surface of the floor plate 26 for reception within an internally threaded bore 28 directly within an upper floor 31 of a housing 29, and more specifically the housing container 30. A first cavity 32 is arranged for reception in a complementary manner of the support mount 23, with a second cavity 33 directed into the upper floor 31 arranged for reception of a magnification member 34 therewithin. The magnification member 34 includes a magnetic base 35 magnetically cooperative and attracted to a ferrous second cavity floor 36 to provide for positioning of the magnification member 34 in a vertical orientation for visual inspection as required.

A gauge member plurality of slots 37 includes a plurality of the gauge members 11 therewithin. A container lid 38 is hingedly mounted relative to the housing container 30, including a lid latch 38a mounted to the container lid 38 cooperative with a container lid 30a mounted in the container front wall 30. The apparatus 10 in an assembled configuration is illustrated in the FIGS. 7 and 8 illustrating the orientation oriented for use, wherein the magnification member is oriented for enhanced visual inspection of an associated casing relative to a gauge member and of the gauge member alone as required.

Figure 9:
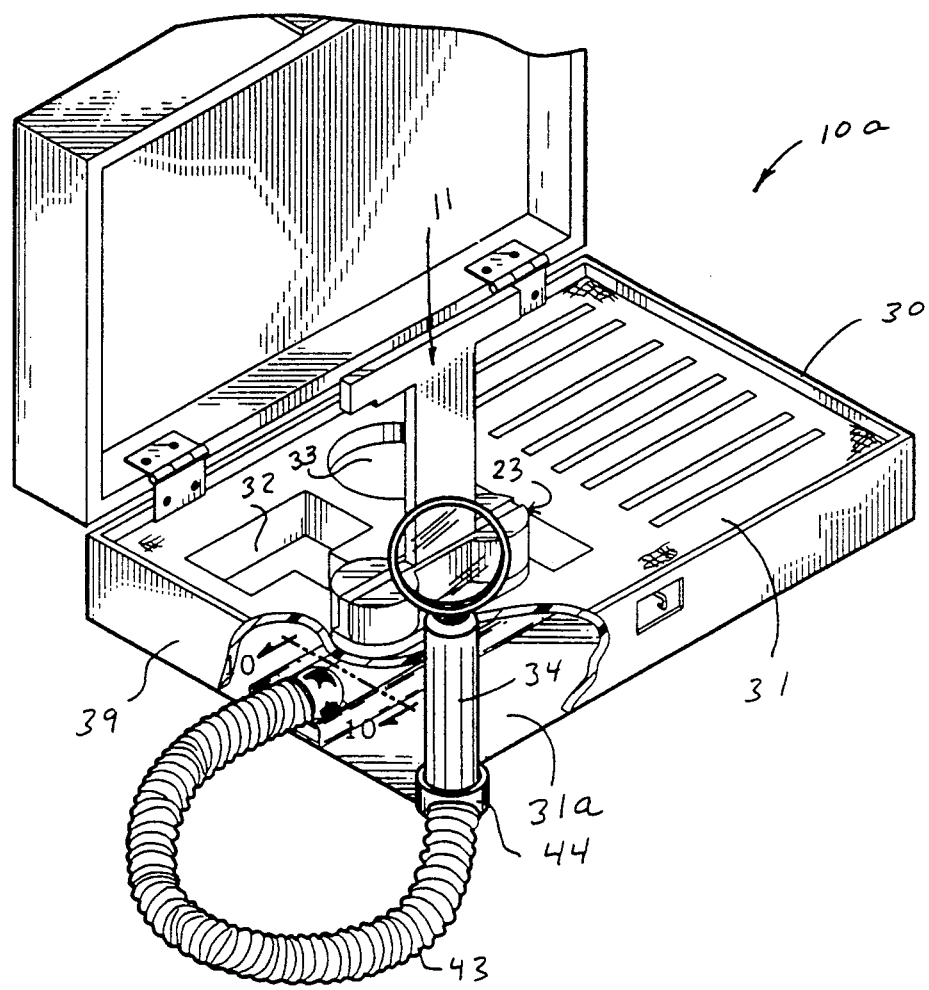
FIG. 9 is an isometric illustration of a modified container housing structure.
Figure 10:
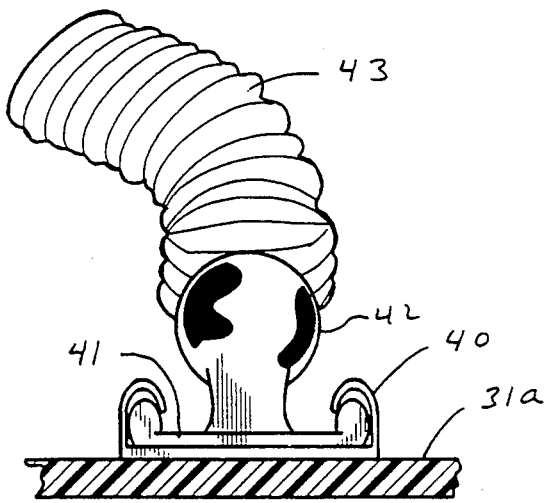
FIG. 10 is an orthographic view, taken along the lines 10—10 of FIG. 9 in the direction indicated by the arrows.

The apparatus 10a, as illustrated in the FIGS. 9 and 10, set forth an organization to permit adjustment of the magnification member 34 as required relative to the housing container 30 for enhanced orientation and positioning of the magnification member in use. To this end, a guide track 40 is mounted to a container lower floor 31a spaced from and parallel the upper floor 31. A track slide member 41 is slidably contained within the guide track 40 and includes a mounting boss 42 mounted to the slide member. A flexible arm member 43 is secured to the mounting boss and extends through a side wall 39 of the housing container. The flexible arm member 43 includes a ferrous cup 44 mounted to a free distal end of the flexible arm member 43 spaced from the mounting boss 42 for magnetic adherence to the magnification member magnetic base 35 to permit ease of positioning and orientation of the magnification member relative to a gauge member 11 and to various portions of the casing and assembled projectile in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A shell case length gauge apparatus, comprising in combination, at least one gauge member of an "I" shaped configuration, wherein the gauge member includes a gauge member first leg, and a gauge member second leg, the gauge member second leg including a first distal end medially and orthogonally intersecting the first leg, and a third leg, the second leg including a second leg second distal end, the second distal end medially and orthogonally intersecting the third leg, and the first leg including a first leg first planar surface in a facing, parallel, and coextensive relationship to a third leg planar first surface, and a first leg planar second surface coplanar with the first leg planar first surface, wherein the first leg planar second surface is spaced from and parallel a third leg planar second surface, wherein the first leg planar first surface is spaced from the third leg planar first surface a predetermined first length, and the first leg planar second surface is spaced from the third leg planar second surface a predetermined second length less than the first length, and the third leg includes a third leg planar third surface adjacent to and spaced from in a parallel relationship the third leg planar second surface and spaced from the first leg planar second surface a third length greater than the second length, and the first leg includes a dovetail projection projecting below the first leg and coextensive with the first leg, and a support mount arranged for receiving the gauge member, the support mount including a slot, the slot arranged for complementarily receiving the first leg therewithin, the slide including a dovetail recess formed at a lower distal end of the slot coextensive therewithin, wherein the dovetail recess is positioned above a floor plate, the floor plate oriented orthogonally relative to the slot, and the floor plate including a support rod projecting orthogonally below the floor plate, and a housing member, the housing member including a housing container, the housing container including an upper floor, the upper floor including a bore for receiving the support rod therewithin, and the upper floor including a first cavity to complementarily receive the support mount, wherein the support mount is removed from the bore.

2. An apparatus as set forth in claim 1 wherein the upper floor includes a second cavity, and a magnification member complementarily positioned within the second cavity and removably mounted therefrom, the magnification member including a magnetic base, and the second cavity including a ferrous second cavity floor for magnetically attracting the magnetic base for positioning the magnification member relative to the support mount when the support is positioned within the bore, and the upper floor further includes at least one gauge member slot to receive the at least one gauge member therewithin.

3. An apparatus as set forth in claim 2 including a container lid hingedly mounted to the housing container, the container lid including a container latch, and the container lid including a lid latch, wherein the lid latch is arranged for selective securement to the container latch.

4. An apparatus as set forth in claim 3 wherein the housing container includes a lower floor, the lower floor is spaced below and in a parallel relationship relative to the upper floor, and the housing container including a side wall positioned between the upper floor and the lower floor, and a guide track fixedly mounted to the container floor, the guide track including a slide member slidably mounted within the guide track, the slide member including a mounting boss secured to the slide member, and a flexible arm member including a lower distal end, wherein the lower distal end is secured to the mounting boss, and the flexible arm member is arranged for projection through the side wall, and an outer distal end of the flexible member includes a ferrous cup for magnetically adhering the magnetic base of the magnification member.

* * * * *